United States Patent [19]

Patla et al.

[11] Patent Number: 4,939,460

[45] Date of Patent: Jul. 3, 1990

[54] INDIGENOUS ELECTROMAGNETIC RADIATION BASED METHOD FOR DETECTING GEOLOGIC DEPOSITS

[76] Inventors: Louis J. Patla, Huntington, Ind.; Donald L. Patla, executor, 101 W. 81st St., New York, N.Y. 10024

[21] Appl. No.: 132,591

[22] Filed: Dec. 14, 1987

[51] Int. Cl.$^5$ ............................................. G01V 3/08
[52] U.S. Cl. .................................... 324/303; 324/345; 324/350
[58] Field of Search ............... 324/301, 303, 307, 345, 324/346, 347–351; 73/151, 152

[56] References Cited

U.S. PATENT DOCUMENTS

| | | | |
|---|---|---|---|
| 3,020,469 | 2/1962 | O'Reilly | 324/303 |
| 3,113,087 | 12/1963 | Codrington | 324/303 |
| 3,324,813 | 10/1967 | Anderson et al. | 324/307 X |
| 3,406,353 | 10/1968 | Mueller | 324/307 X |
| 3,657,730 | 4/1972 | Robinson et al. | 324/303 |
| 3,775,671 | 11/1973 | Brown | 324/303 |
| 3,943,436 | 3/1976 | Pirson et al. | 324/345 |
| 4,591,791 | 5/1986 | Bostick, Jr. | 324/350 |
| 4,710,713 | 12/1987 | Strikman | 324/303 |
| 4,717,878 | 1/1988 | Taicher et al. | 324/303 |

Primary Examiner—Reinhard J. Eisenzopf
Assistant Examiner—Warren S. Edmonds
Attorney, Agent, or Firm—Steinberg & Raskin

[57] ABSTRACT

A method for detecting a geologic deposit of a selected substance. In the method, the intensity of the local geomagnetic field at one or more measurement sites at a first location is resolved. During selected time intervals, at each site, the amplitude of the indigenous terrestial alternating electromagnetic radiation is measured at a frequency in the vicinity of a frequency equal to the local geomagnetic field intensity multiplied by the Larmor constant of the selected substance and divided by $2\pi$. Each measurement is intergated over a respective time interval to yield one or more integrated values. The integrated values are analyzed.

20 Claims, 6 Drawing Sheets

FIG. I

INDIGENOUS ELECTROMAGNETIC RADIATION BASED METHOD FOR DETECTING GEOLOGIC DEPOSITS

BACKGROUND OF THE INVENTION

This invention relates to methods for remote detection and more particularly to methods for detecting geologic deposits.

Methods for detecting mineral and petrochemical geologic deposits may be roughly divided into two types: supplied signal methods, in which a signal is both induced and observed at a site of interest and indigenous signal methods, in which a signal is observed, but is not induced at the site of interest. Examples of the former are resistivity studies based on an external voltage applied between two or more buried electrodes, inductive methods based upon changes in inductance of an applied signal at a receiver a short distance away, and nuclear magnetic logging methods based upon nuclear precession in materials adjacent an instrument which supplies a magnetic field. Examples of methods relying on indigenous signals are magnetic field mapping and radioactivity mapping.

A shortcoming of these induced signal methods is that the signals are rapidly attenuated with depth or horizontal distance. This limits the versatility of these methods. Indigenous signal methods often have the shortcoming that the characteristic measured may only distantly correlate with the material sought. This is not the case where, for example, radioactivity measurements are used to search for uranium, but is the case where radioactivity measurements are used to help detect oil and gas deposits.

It is therefore highly desireable to provide an improved method for detecting geologic deposits.

It is also highly desireable to provide an improved method for detecting geologic deposits which relies upon an indigenous terrestrial alternating electromagnetic radiation signal.

It is also highly desirable to provide an improved method for detecting geologic deposits in which an indigenous terrestrial alternating electromagnetic radiation signal, which correlates with the material sought is measured.

It would finally be highly desirable to provide an improved method for detecting geologic deposits which meets all of the above desired features.

SUMMARY OF THE INVENTION

It is an object of the invention to provide an improved method for detecting geologic deposits.

It is another object of the invention to provide an improved method for detecting geologic deposits which relies upon an indigenous terrestrial alternating electromagnetic radiation signal.

It is another object of the invention to provide an improved method for detecting geologic deposits in which an indigenous terrestrial alternating electromagnetic radiation signal, which correlates with the material sought is measured.

It is another object of the invention to provide an improved method for detecting geologic deposits which meets all of the above desired features.

In the broader aspects of the invention there is provided a method for detecting a geologic deposit of a selected substance. In the method, the intensity of the local geomagnetic field at one or more measurement sites at a first location is resolved. During selected time intervals, at each site, the amplitude of the indigenous terrestrial alternating electromagnetic radiation is measured at a frequency in the vicinity of a frequency equal to said local geomagnetic field intensity multiplied by the Lamor constant of the selected substance and divided by $2\pi$. Each measurement is intergated over a respective time interval to yield one or more integrated values. The integrated values are analyzed.

A BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein.

Figure 3:
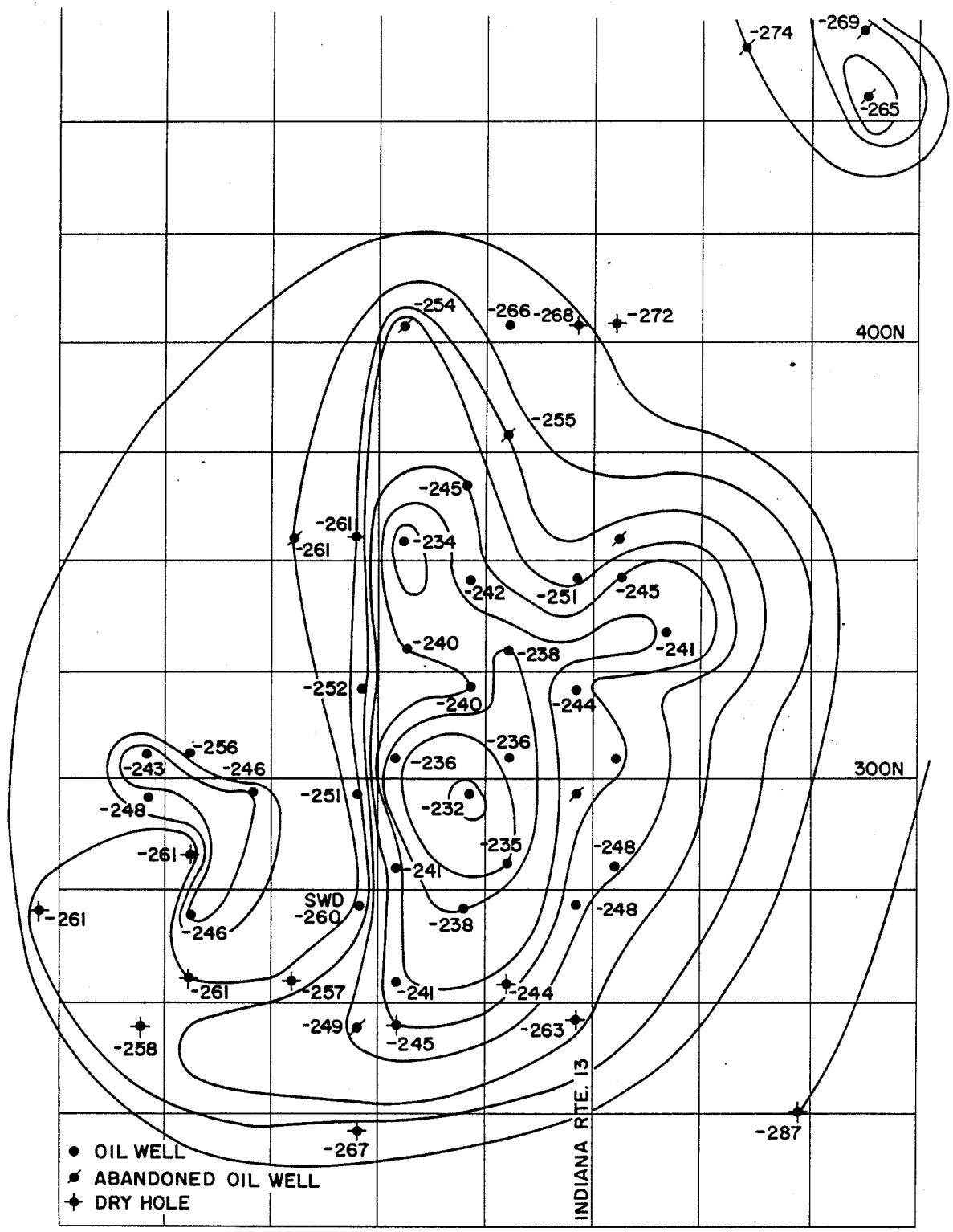

FIG. 3 is a map of Urbana Oil Field, Urbana, Indiana in Wabash County Indiana. The scale is one inch equals one-quarter mile. Oil drilling sites are indicated as follows: "." indicates a successful oil well, "⊘" indicates an oil well which was abandoned and " ✦ " indicates a dry hole. Numerical values of subsea depth of the Trenton Oil Rock Formation in feet below sea level at the drilling sites are indicated. Depth contour lines based upon the indicated subsea values are shown.

Figure 4:
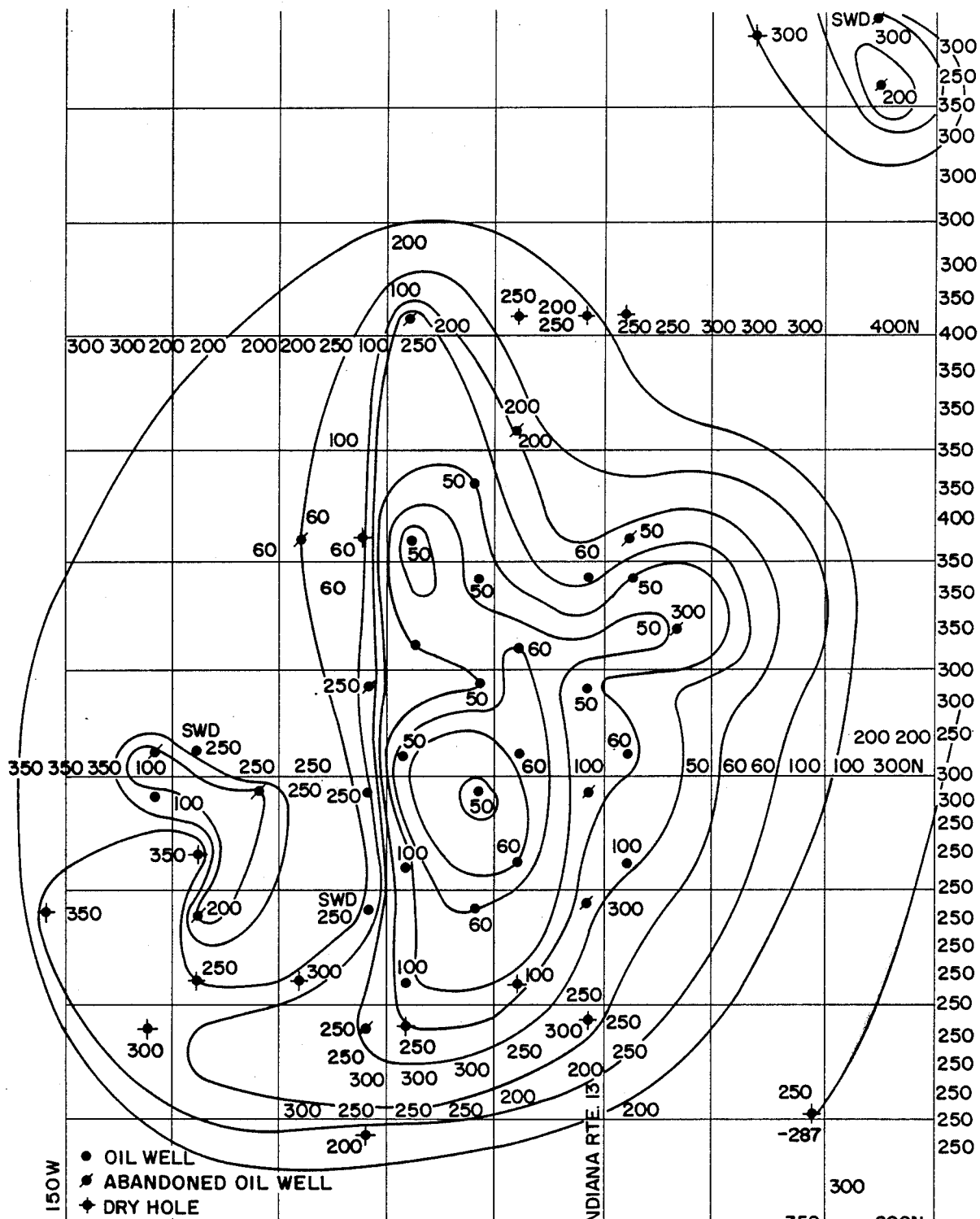

FIG. 4 is the same map as FIG. 3, except that subsea depth values have been omitted and integrated values from the method of the invention have been added. The integrated values in FIG. 4 appear at the sites where the integrated values were taken in accordance with the method of the invention.

Figure 5:
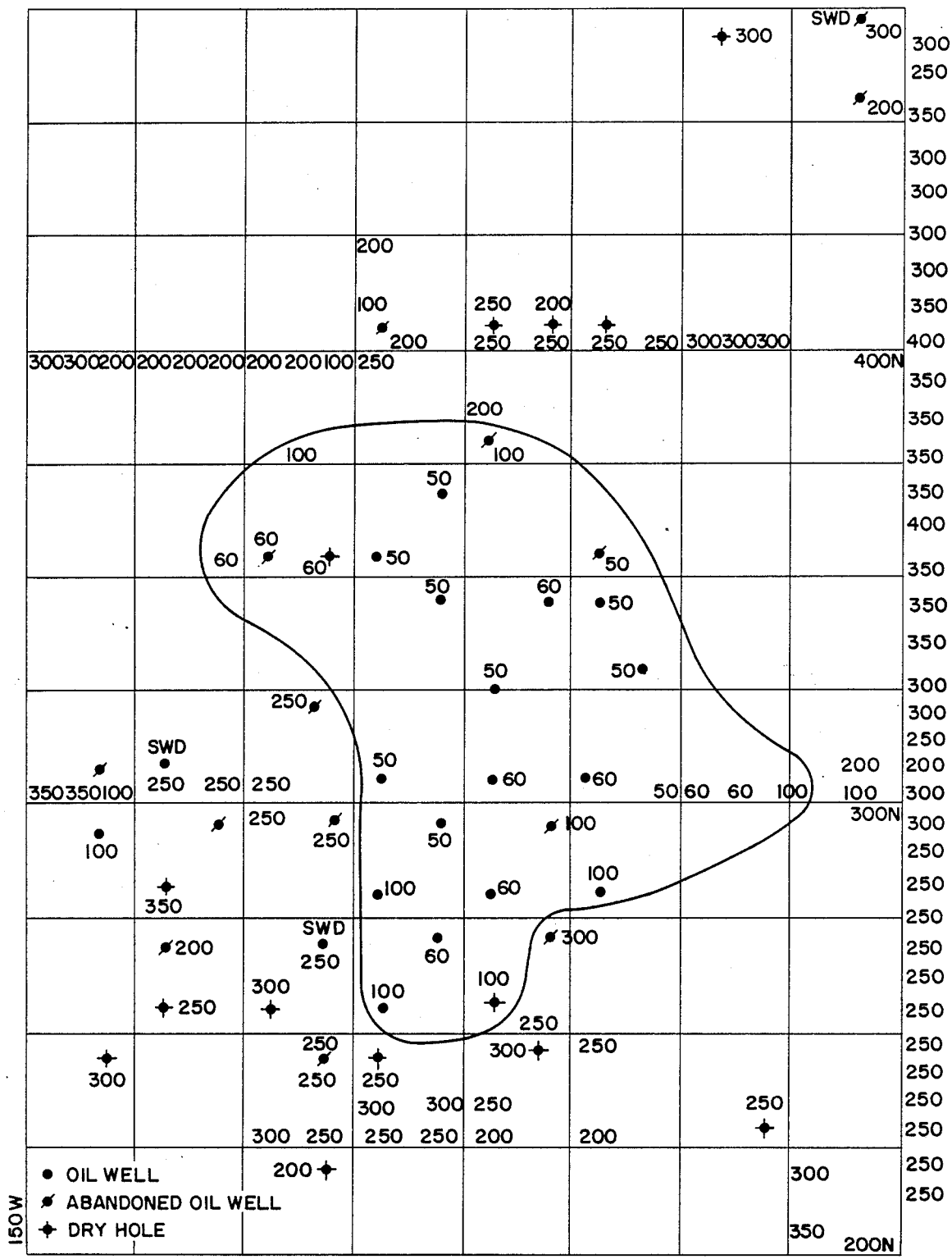

FIG. 5 is the same map as FIG. 4, except that depth contour lines have been omitted and a contour line has been added, which roughly outlines an oil deposit determined by the method of the invention.

Figure 6:
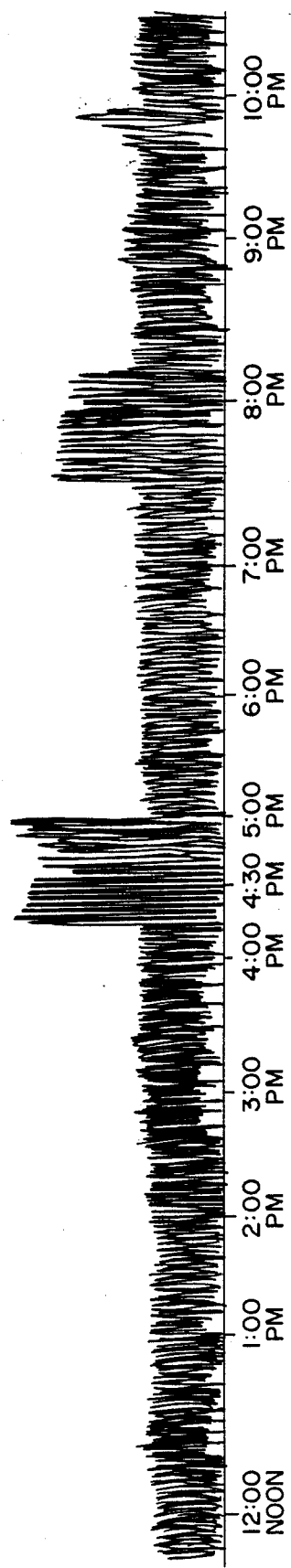

FIG. 6 is a chart recording from a base station of reference values taken during the time period indicated along the vertical axis. Horizontal lines indicate ten minute intervals. Measurements were taken at approximately two minute intervals.

DESCRIPTION OF A SPECIFIC EMBODIMENT

In the method of detecting a geologic substance, of the invention, the amplitude of the indigenous terrestrial alternating electromagnetic radiation at a selected frequency is measured at one or more measurement sites and then the measurements are analyzed.

Figure 1:
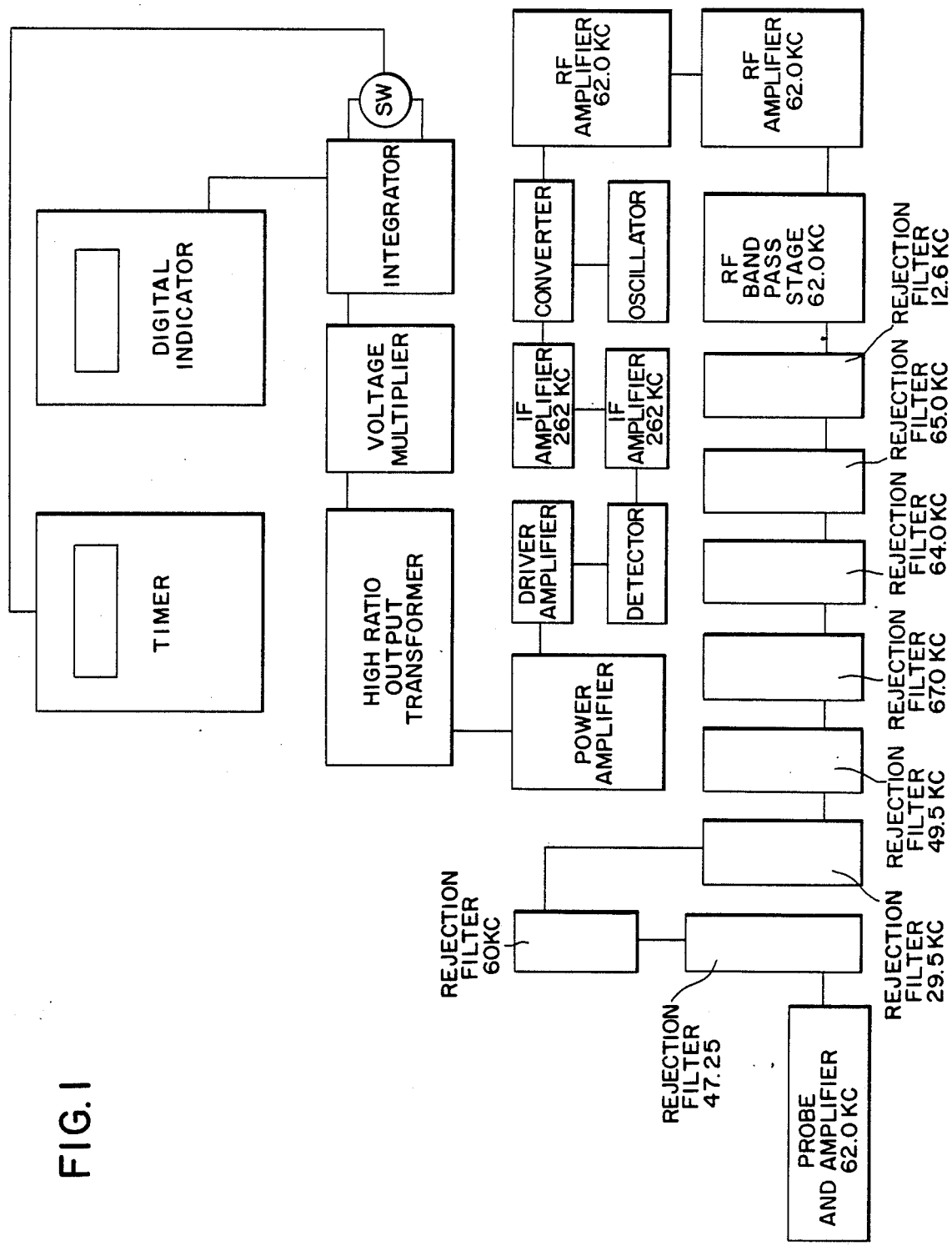
FIG. 1 is a block diagram of an example of a detector, less power supply and voltage regulators, that can be used in the method of the invention.
Figure 2:
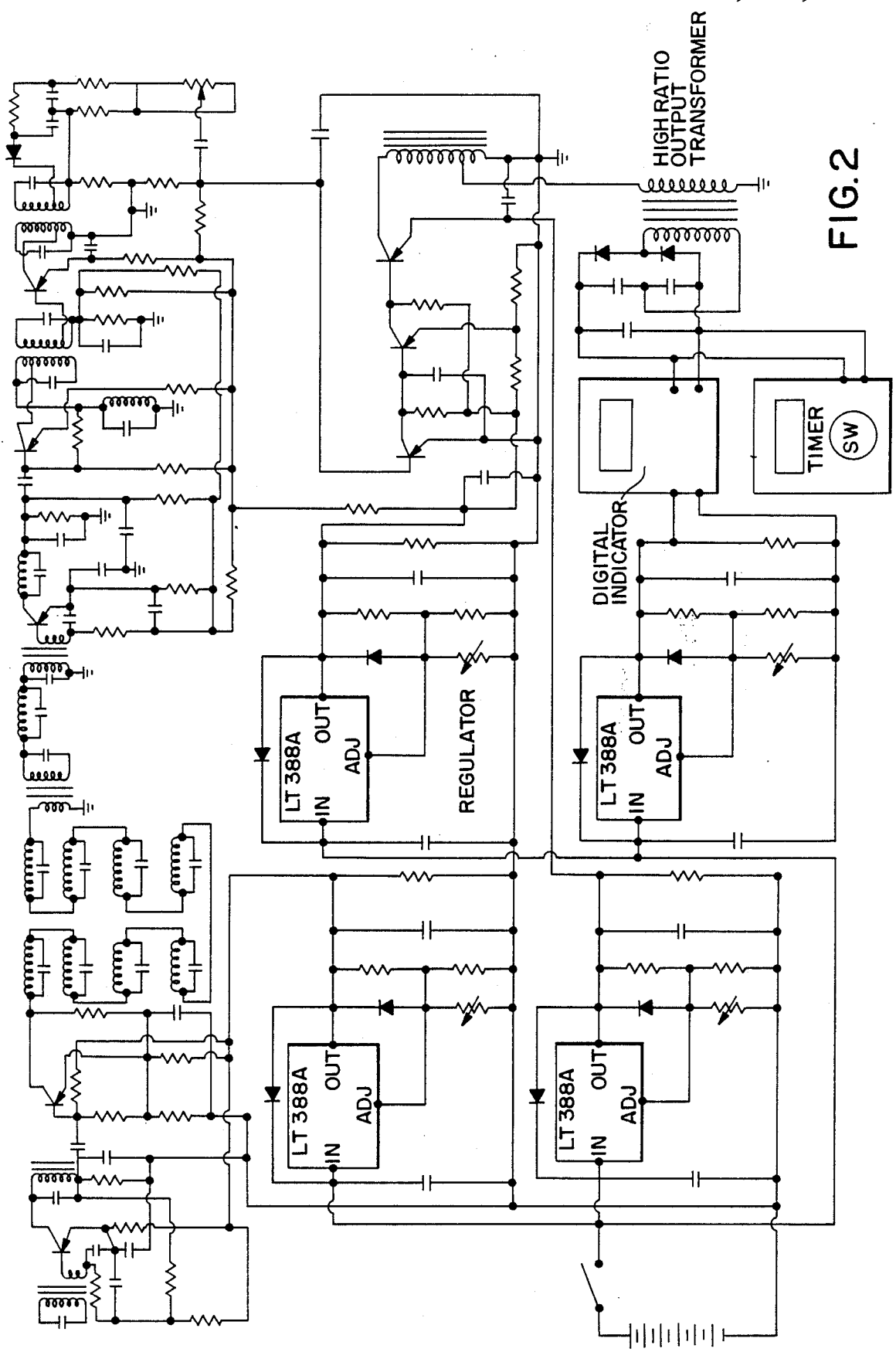
FIG. 2 is a schematic of the detector of FIG. 1.

The term "measurement frequency" used herein refers to a selected frequency band having a narrow bandwidth, for example, a band- width of one kilohertz. The term "measurement site" is used herein to refer to the exact position within a larger geographic location at which a measurement is taken in accordance with the method of the invention. Thus, for example, FIG. 5 illustrates one location, which includes a measurement site at each integrated value shown on FIG. 5 embodiment, the measurements such as shown in FIG. 6 can be integrated and displayed by a digital indicator such as shown in FIGS. 1 and 2.

The amplitude of the radiation at the selected frequency at each location of interest is measured during a selected interval of time. It is desirable in analyzing the measurements to integrate over respective intervals of time to yield integrated values. It is convenient to use a single time interval, for example, one minute, when the method of the invention is used to produce a series of measurements. The integrated values are arbitrary readings and may be changed by altering the measuring equipment or the integrating time. The relative magnitude of values, however, is not changed and reflects actual differences in geologic deposits.

In a particular embodiment of the method of the invention, the ratio of oil bearing site integrated values to non-oil bearing site integrated values is less than about 1:2 and more desirably between about 1:3 and about 1:5 and still more desirably is less than about 1:5.

The term "indigenous terrestrial alternating electromagnetic radiation" used herein, refers to indigenous geologic radiation, that is, alternating geologic currents which are naturally occuring and/or which are either incidental to human activity unrelated to the method of the invention or induced as a part of the method of the invention, at a site separated from the location of a detecting device utilized in the method of the invention.

In a specific embodiment, such geologic currents may be induced, for example by a communications radio transmitter and antenna operating at an appropriate frequency. It is desirable that the transmitter be distant from the sites to be measured, because the field intensity of the transmitted radiation is inversely proportional to the square of the distance from the transmitter. If the transmitter is distant from the sites to be measured, the difference in field intensity of the transmitted radiation between sites is too small to alter the relative proportions of measurements at the sites. The term "distant" used herein, may thus be defined as a geographic separation sufficient to reduce differences in integrated values, at identical sites within the same location, below the detection ability of the detector used in the performance of the method of the invention.

It is convenient to reduce each integrated value by a reference integrated value obtained, at the same time, by a detector at a base location, thus obtaining an adjusted integrated value. The base location may conveniently be chosen so as to be remote from locations of interest to be measured, although not so remote as to be subject to differing indigenous terrestrial alternating electromagnetic radiation. For example, telluric currents show a diurnal and a seasonal variation. A base location in a different hemisphere would not reflect the diurnal or seasonal variation in measurements take at the location of interest. An appropriate base station can also accomodate variation due to other factors such as, for example, sun spots, earthquakes, and underground atomic tests.

FIG. 6 illustrates a chart recording of reference values taken at a base station.

In using the method of the invention to search for or define the boundaries of a geologic deposit, a variety of approaches may be used, for example, the measurements may be made at a number of separated sites to derive a grid or a random search may be made; followed, after finding a desired measurement, by taking measurements along parallel lines.

The selected frequency of the indigenous terrestrial alternating electromagnetic radiation may, for example, in the case of oil deposits within the continental United States, be between about 59 kilohertz and about 63 kilohertz and have a bandwidth of about one kilohertz. At the selected frequency, a difference in amplitude of radiation between different locations may reflect a quantitative difference in geologic oil deposits as indicated by FIG. 4.

Detectors known to persons skilled in the art may be used in the practice of the invention. In the specific embodiment of the detector of FIGS. 1 and 2, the receiving probe is a toroidal inductor tuned to the frequency of interest, in the case of the detector of FIGS. 1 and 2, 62 KHz. The toroidal inductor is mounted so that its limited external field is in a vertical direction. The detector must be free of spurious responses, in particular harmonics and subharmonics of the resonant frequency in use.

Referring to the dectector and FIGS. 1 and 2, the detector is shown to consist of a probe or indicator and amplifier 10 which is connected to a series 12 of rejection filters shown to consist of rejection filters 14 through 28. Rejection filter series 12 is connected to an RF band past stage 30 which is connected to series of RF amplifiers 32. RF amplifier series 32 is shown to comprise two RF amplifiers 34 and 36 in FIG. 1. RF amplifier series 32 is connected to a converter 38 shown to comprise an oscillator 40 and a converter 42. Converter 38 is connected to a series 44 of IF amplifiers. IF amplifier series 44 is shown to comprise an IF amplifier 46 and an IF amplifier 48. IF amplifier series 44 is connected to a detector 50. The output of detector 50 is amplified and transmitted to high ratio output transformer 56. In the specific embodiment shown in FIG. 1, detector 50 is connected to a driver amplifier 52 which is connected to a power amplifier 54. In the specific embodiment shown in FIG. 2, converter 38 and amplifiers 46, 48 and detector 50 are all shown together. The output of power amplifier 54 is connected to a high ratio output transformer 56. Transformer 56 is connected to an integrater 58. Integrater 58 comprises a voltage multiplier 60 and an integrater 62. Integrater 62 is connected to digital indicator 64 and timer 66. Timer 66 can be any one of a number of commercial stop watches which can be zeroed when desired. Digital indicator 64 can be any number of one of commercially available digital read-out devices. Receiving probe is connected to amplifier 10. FIG. 2 illustrates the detector of FIG. 1 connected to a power supply 70, not shown in FIG. 1.

This detector may be operated as follows. The detector is first placed on the ground at a location of interest. Power is then switched on in the unit. No warm up time is required. The unit is then initialized bringing the integrator's digital indicator and timer to zero or starting position. The unit is then actuated, beginning a measurement. At the end of a selected time interval, the integrator is stopped and the integrated value as shown by the digital integrator is recorded.

It is estimated that the above-described detector, when used in the method of the invention, has a resolution of about a 500 foot diameter circle. Accordingly, neighboring locations measured, according to the method of the invention using the detector, should be separated by greater than about 500 feet.

The method of the invention is not limited to use of a detector placed on the ground. The detector may be raised above the ground. When the detector is on the ground, the signal is higher than when the detector is above the ground, however, with adjustments in detector sensitivity, the method of the invention can be practiced above the ground. This allows the detector to be mounted in, a vehicle or in or suspended from a helicopter or airplane or ship. Height above the ground must, however be kept constant or compensation for changes must be made. The term "on the earth's surface" as used herein encompasses "on the ground", "above the ground", "in a vehicle", "suspended from a helicopter or airplane or ship".

The frequency band cited above for oil deposits within the continental United States, between about 59 KHz and about 63 KHz, is in the vicinity of a "determined frequency", "V" in megahertz, calculated using the following equation:

$$V = \frac{\lambda H}{2\pi}$$

where $\lambda$ is between about 0.70216 and about 0.70220 and, H is the magnitude of the geomagnetic field in gauss. If a numerical value for the average geomagnetic field in the continental United States is inserted in the above equation, H is about 0.544925 gauss and V is about 61 KHz. The geomagnetic field may vary from one location to another location. Within the continental United States that variation is relatively minimal. Specific values of the geomagnetic field are known and published on various maps and in various tables for various locations.

It is believed that the method of the invention operates according to the following explanation. The method of the invention measures the amplitude of indigenous terrestrial alternating electromagnetic radiation at a frequency, at least in the vicinity of a range of frequencies at which magnetic resonance occurs. It is believed, for example, that the nuclear magnetic resonance of Carbon-13, which has a natural abundance of about one percent and a Lamor constant of between about 0.70216 and 0.70220, occurs in geologic deposits as a result of indigenous terrestrial alternating electromagnetic radiation within a band from about 59 KHz to about 63 KHz and that the amplitude of indigenous terrestrial alternating electromagnetic radiation at the frequency of interest is reduced as a result of the magnetic resonance of appropriate atoms like carbon-13 within geologic deposits of resonant materials.

The term "resonant materials" is used herein to refer to materials which include atoms capable of exhibiting observable magnetic resonance.

The above quoted equation is one form of the Larmor theorem, which is used in relation to nuclear magnetic resonance. The Larmor theorem states that for electrons moving in a single central field of force, motion in a uniform magnetic field, to the first order, is the same as a possible motion without the magnetic field except for the superposition of a common precession of angular frequency.

Nuclear magnetic resonance is a phenonmemon exhibited by nuclei of atoms having a non-zero magnetic moment and spin angular moment. Such atoms behave like tiny bar magnets. If these atoms are placed in an external magnetic field, their nuclei will assume certain quantized nuclear spin orientations, which are known as Zeeman energy levels. The nuclei undergo transitions between Zeeman levels if alternating electromagnetic radiation is supplied at an exact transition or resonance frequency. This results in an observable absorption of radiation at the resonance frequency. The resonant frequency will change if the external magnetic field is changed.

In actual practice, resonance is not generally seen at a frequency predicted for a single atom, since the environment of neigboring atoms and other factors such as inhomogeneity of the static magnetic field can effect magnetic resonance and cause shifting and broadening of observed resonant frequencies.

In accordance with this explanation and the first equation above, the bandwidth of the frequency band measured in the method of the invention is inclusive of at least a part of a frequency range at which magnetic resonance of resonant materials of interest is predicted.

The following examples are presented herein to more fully illustrate the present invention. It should be understood, however, that the invention is not limited to the limitations of the examples, since it is well within the skill of a person skilled in the art to practice other than as presented in the examples.

EXAMPLE I

The detector shown in FIGS. 1 and 2 and described above was placed on the ground at the Urban Field, Urbana, Ind. at the locations shown in FIGS. 4. The detector was operated as described above and integrated values as shown in FIGS. 4 and 5, were obtained using a one minute time interval. Geologic currents were not induced for the measurements. Known oil bearing deposits at Urbana Field are shown by indicated oil drilling results, which correspond well with Trenton Oil Rock Formation contours shown in FIG. 3 and with the contour line shown in FIG. 5, which encloses an area which has the higher integrated values.

EXAMPLE II

The National Bureau of Standards Station WWVB, a standard frequency station, transmitting continuously on a frequency of 60 KHz, at Fort Collins, Colo. was utilized as transmitter. This station operates at 10 kilowatts.

The sites of interest were a long distance from the transmitter, near Currant, Nev.; approximately 564 airlines miles from the transmitter. The detector was equivalent to the detector of FIGS. 1 and 2, however, the components of the detector were selected to receive and amplify a 60 KHz signal, instead of the frequency of the detector of FIGS. 1 and 2. The detector was installed in a vehicle with the sensor open to the ground through an opening in the metal of the vehicle floor.

The detector was driven to a series of sites, separated from each other by a distance of one tenth mile or one half mile as indicated.

The detector was operated as described above and integrated values, using a one minute time interval were obtained.

Table I lists those integrated values. Oil deposits are known to occur at location numbers 15, 16, 17, 18, 19, 20, 21, 22 and 23.

These readings were taken along U.S. Hwy. 6 leading east to Currant, Nev., starting at a gravel "T" road located at Nye County, Nev. at the 104 road marker. U.S. Hwy 6 crosses Sections 21, 22, 23, 24, 27 and 28 of Town 9 North, Range 57 East.

A discovery well was later drilled in Section 27. Twenty oil wells were drilled in Section 23 and other wells were drilled nearby. The discovery well in Section 27 pumped about 1,200 barrels of oil per day. Many of the others are large producers also, one producing 2,400 barrels per day.

EXAMPLE III

A detector having a torodial inductor tuned to 57 KHz was utilized to search for hydrocarbon deposits. The detector is equivalent to the detector of FIGS. 1 and 2, however, the components of the detector are selected to receive and amplify a 57 KHz signal instead of the freqency of the detector of FIGS. 1 and 2. The 57 KHz tuned detector was placed on the ground at Rich Valley, Indiana Oil Field at a series of sites separated from each other by a distance of 2,000 feet. The detector was operated as described above for the 60 KHz detector and integrated values, using a one minute time interval, were obtained. Table II lists those integrated values. Known oil deposits occur at locations numbers 121 and 122. Integrated values measured appear in Table II.

Number 121 is a 35 barrels a day oil well.
Number 122 is a 5 barrels a day oil well.
Number 123 is a water disposal well.
Number 124 is a dry hole well.

In this Example, the detector frequency was too low and the detection of oil deposits was not achieved. The integrated values however do correlate with oil well formation as the oil wells had the highest readings and the disposal well and dry hole had lower readings.

EXAMPLE IV

A detector having a torodial inductor tuned to 62 KHz was utilized to search for oil deposits. The detector is equivalent to the detector of FIGS. 1 and 2, however, the components of the detector were selector to receive and amplify a 62 KHz signal instead of the frequency of the detector of FIGS. 1 and 2. The 62 KHz tuned detector was placed on the ground in area of town of Jay, Santa Rosa County, Forida at the series of sites listed below.

The detector was operated as described above for the 60 KHz detector and integrated values, using a one minute time interval were obtained. Table III lists those integrated values. Known oil deposits occur as follows: well 31-flowing oil, 32-assumed oil well, 35-known oil nearby. The oil field is known as a billion barrel field.

EXAMPLE V

A detector having a torodial inductor tuned to 62 KHz was utilized to search for oil deposits. The detector was equivalent to the detector of FIGS. 1 and 2, however, the components of the detector were selected to receive and amplify a 62 KHz signal instead of the frequency of the detector of FIGS. 1 and 2. The 62 KHz tuned detector was placed on the ground at Spindletop Oil Field, Beaumont, Tex. at a series of sites separated from each other by a distance of approximately 600 feet. The detector was operated as described above for the 60 KHz detector and integrated values, using a one minute time interval, were obtained. Table IV lists those integrated values. Known oil deposits occur at location numbers 41, 42, 43, 44, 45, and 46.

The above oil wells are right at the discovery location of the Spindletop Oil Well. The readings are very high for an oil well, however this is a depleted oil area and a sign identifying the particular location was titled as follows: Texas Water and Oil Company. The above readings are also indicative that at this particular location there are no deeper reservoirs.

TABLE I

| LOCATION | DISTANCE FROM START IN MILES | INTEGRATED VALUE (In Millivolts) | SECTION |
| --- | --- | --- | --- |
| 11 | 0 | 300 | 22/27 |
| 12 | .1 | 500 | 22/27 |
| 13 | .2 | 300 | 22/27 |
| 14 | .3 | 200 | 22/27 |
| 15 | .4 | 50 | 22/27 |
| 16 | .5 | 50 | 22/27 |
| 17 | .6 | 50 | 22/27 |
| 18 | .7 | 50 | 22/27 |
| 19 | .8 | 50 | 22/27 |
| 20 | .9 | 50 | 22/27 |
| 21 | 1.0 | 50 | 23 |
| 22 | 1.5 | 50 | 23 |
| 23 | 2.0 | 50 | 23 |
| 24 | 2.5 | 200 | 24 |
| 25 | 2.8 | 200 | 24 |
| 26 | 3.0 | 300 | 24 |
| 27 | 3.2 | 200 | — |
| 28 | 3.4 | 200 | — |
| 29 | 3.5 | 200 | — |

TABLE II

| LOCATION | INTEGRATED VALUE (In Millivolts) |
| --- | --- |
| 121 | 219 |
| 122 | 207 |
| 123 | 204 |
| 124 | 195 |

TABLE III

| LOCATION | DESCRIPTION OF LOCATION | INTEGRATED VALUE (In Millivolts) |
| --- | --- | --- |
| 31 | 1,200 Feet South Of Bank Parking Lot | 0 |
| 32 | In Back Of Bank In Parking Lot | 5 |
| 33 | On Route 89, 3 Miles South Of Jay, Florida at Oil Storage Tank Site | 700 |
| 34 | 5 Miles North Of Jay On Route 89 at Alabama Border | 500 |
| 35 | County Road 1 Mile East Of Pollard, Alabama | 200 |

TABLE IV

| LOCATION | INTEGRATED VALUE (In Millivolts) |
| --- | --- |
| 41 | 250 |
| 42 | 275 |
| 43 | 300 |
| 44 | 360 |
| 45 | 220 |
| 46 | 300 |

While a specific embodiment of the invention has been shown and described herein for purposes of illustration, protection afforded by any patent which may issue upon this application is not strictly limited to the disclosed embodiment; but extends to all methods which fall within the scope of the claims which are appended hereto.

What is claimed is:

1. A method for detecting geological deposits comprising the steps of finding at one or more measurement sites at a first location on the earth's surface a detectable intensity of the earth's geomagnetic field, detecting and measuring during selected time intervals at each of said sites the induced amplitude of the indigenous terrestrial alternating electromagnetic radiation at a measurement by an inducer frequency, said frequency being in the vicinity of said geomagnetic field intensity multiplied by the Larmor constant of the selected substance and divided by $2\pi$, and comparing said measurements to induced measurements of the earth's geomagnetic field at locations known to have and known not to have the geologic deposit sought thereby to locate the sought geologic deposits.

2. The method of claim 1 wherein said selected substance is a hydrocarbon deposit and wherein said Larmor constant is between about 0.70216 and about 0.70220.

3. The method of claim 1 wherein said analyzing step further comprises comparing the relative magnitudes of said integrated values to each other.

4. The method of claim 1 wherein said selected time intervals are each one minute.

5. The method of claim 1 wherein said measuring step is performed at said measurement sites at a position spaced from the geologic surface.

6. The method of claim 1 further comprising repeating said finding and measuring steps at a remote reference location to yield a reference integrated value and wherein said comparing step further comprises reducing said integrated values by said reference integrated value to yield standardized integrated values, and comparing said standardized integrated values.

7. The method of claim 1 wherein said substance of interest is a hydrocarbon and wherein said measurement frequency is in the vicinity of about 60 KHz.

8. The method of claim 1 wherein said measurement frequency is within the vicinity of from about 59 KHz to about 63 KHz.

9. The method of claim 1 wherein said measurement frequency is about one kilohertz in bandwidth.

10. The method of claim 1 further comprising the step of supplying alternating electromagnetic radiations at said measurement frequency at a reference location separated from said first location.

11. The method of claim 10 wherein said reference location is distant from said first location.

12. The method of claim 1 wherein said comparing step further comprises recording said measurements at said measurement sites on a map of said first location, drawing contour lines on said map between measurements of constant magnitude of indigenous terrestrial alternating electromagnetic radiation at said frequency thereby identifying the boundary of the geological deposit.

13. A method for detecting hydrocarbons where the earth's geomagnetic field is about one-half gauss comprising the steps of detecting and measuring during selected time intervals at one or more sites and on the earth's surface the induced amplitude of the indigenous terrestrial alternating electromagnetic radiation at a measurement frequency in the vicinity of from about 59 KHz to about 63 KHz by an inducer, integrating each said measurement over respective time intervals to yield one or more integrated values, and comparing said integrated values with integrated values of the earth's geomagnetic field measured at locations known to have and known not to have the sought hydrocarbons thereby to locate the sought hydrocarbons.

14. The method of claim 13 wherein said comparing step further comprises identifying a set of low integrated values and a set of high integrated values, said low integrated values each having a magitude less than about one-half the magnitude of said high integrated values.

15. The method of claim 14 wherein said low integrated values each have a magnitude between about one-half and about one-fifth the magnitude of said high integrated values.

16. The method of claim 14 wherein said low integrated values each have a magnitude between about one-third and about one-fifth the magnitude of said high integrated values.

17. The method of claim 14 wherein said low integrated values each have a magnitude less than one-fifth the magnitude of said high integrated values.

18. The method of claim 13 wherein said frequency band has a bandwidth of about one kilohertz.

19. A geologic detection method comprising the steps of finding a detectable intensity of the earth's geomagnetic field at one or more measurement sites at a first location on the earth's surface, solving for each of said measurement sites the following equation:

$$V = \frac{\lambda H}{2\pi}$$

wherein V is a determined frequency in megahertz, $\lambda$ is between about 0.70216 and about 0.70220 and H is the earth's geomagnetic field intensity in gauss, detecting and measuring during selected time intervals at each said site the induced amplitude of the indigenous terrestrial alternating electromagnetic radiation at a measurment frequency in the vicinity of said determined frequency by an inducer, integrating each said measurement over a respective time interval to yield one or more integrated values, and comprising said integrated values with integrated values of the earth's geomagnetic field measured at locations known to have and known not to have the geologic deposit sought thereby to locate the sought geologic deposit.

20. The method of claim 19 wherein said analyzing step further comprises the steps of recording said integrated values at said measurement sites on a map of said first locations, drawing contour lines on said map representing lines of constant magnitudes of indigenous terrestrial alternating electromagnetic radiation at said frequency, thereby identifying the boundary of the gelogical deposit.

* * * * *